INVENTORS.
PETER L. HELGESON
EDWARD M. REDSTREAKE
BY
ATTORNEY.

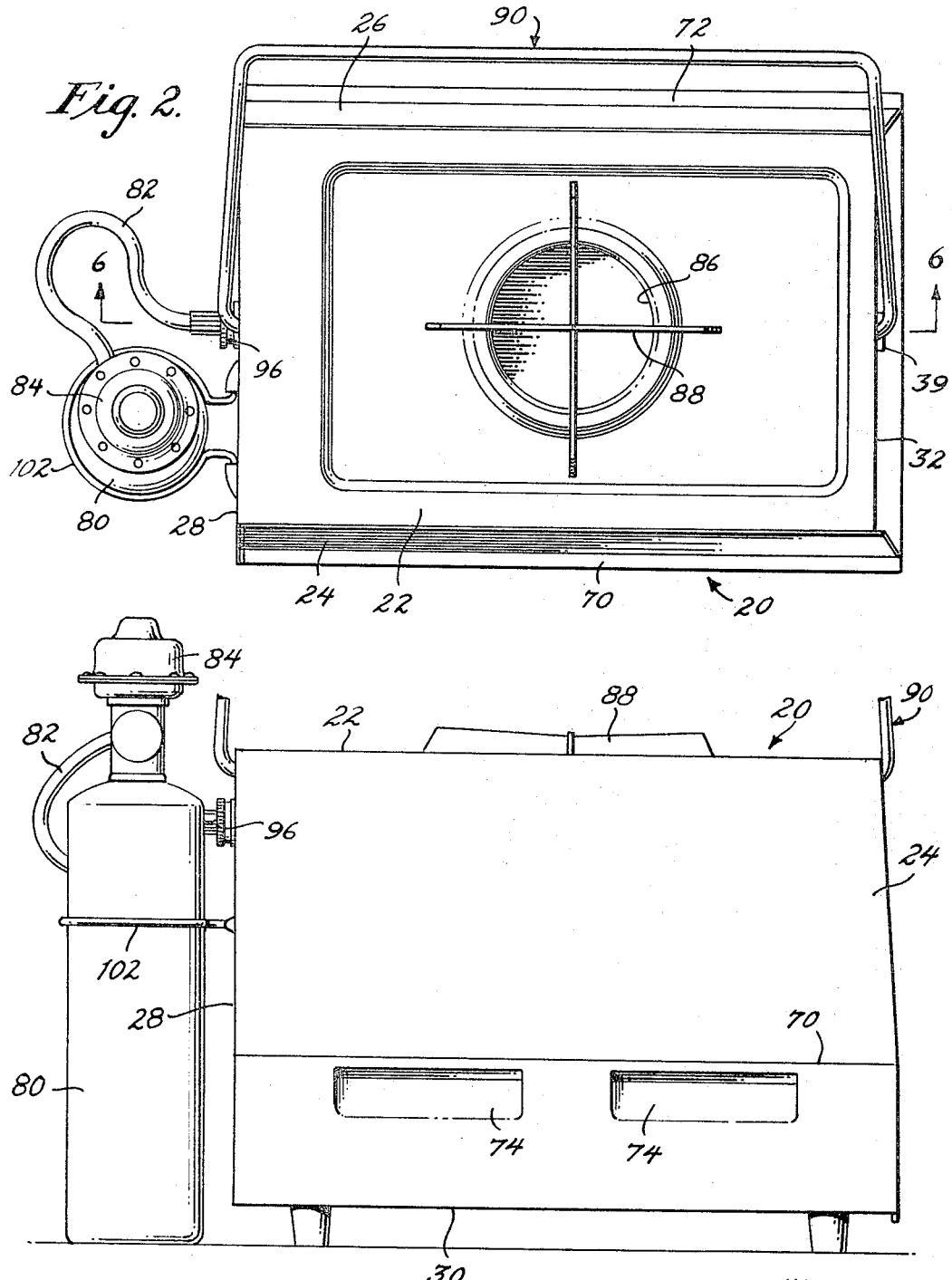

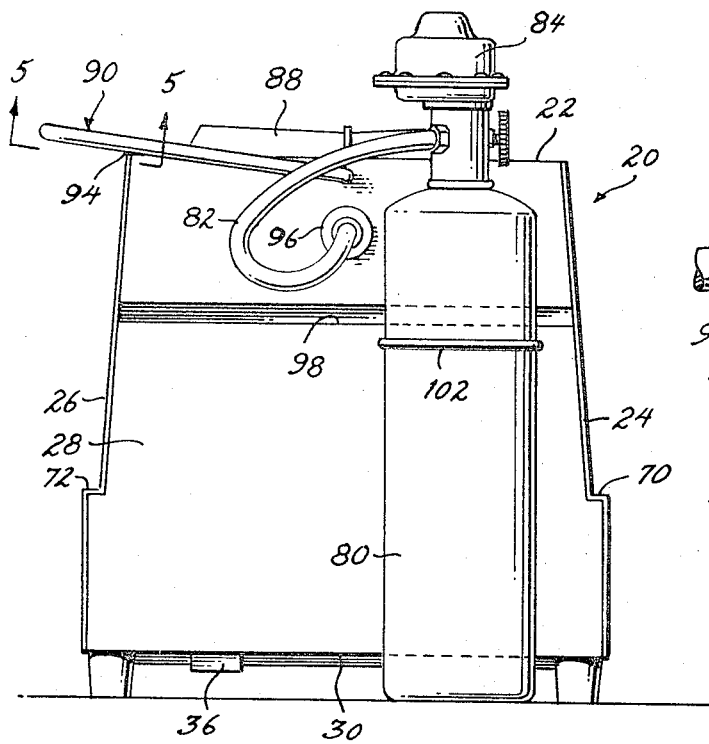
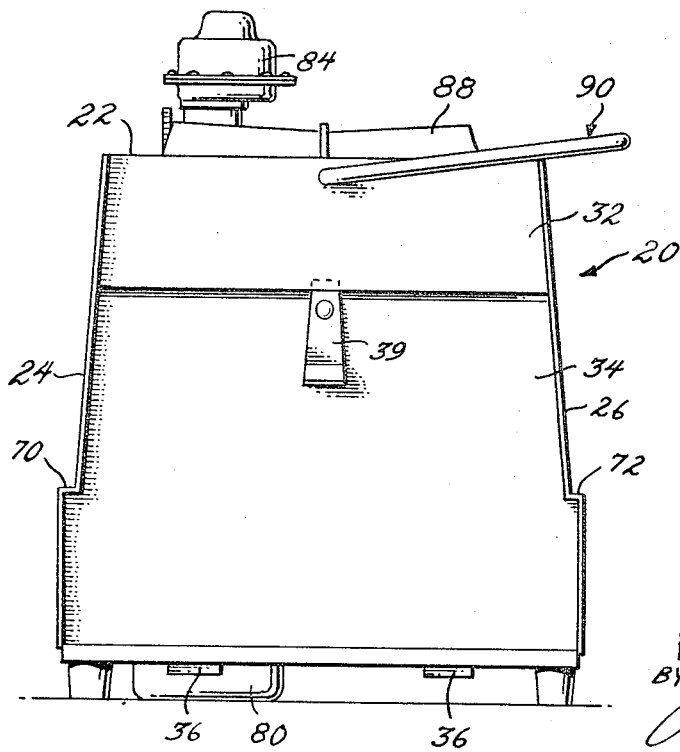

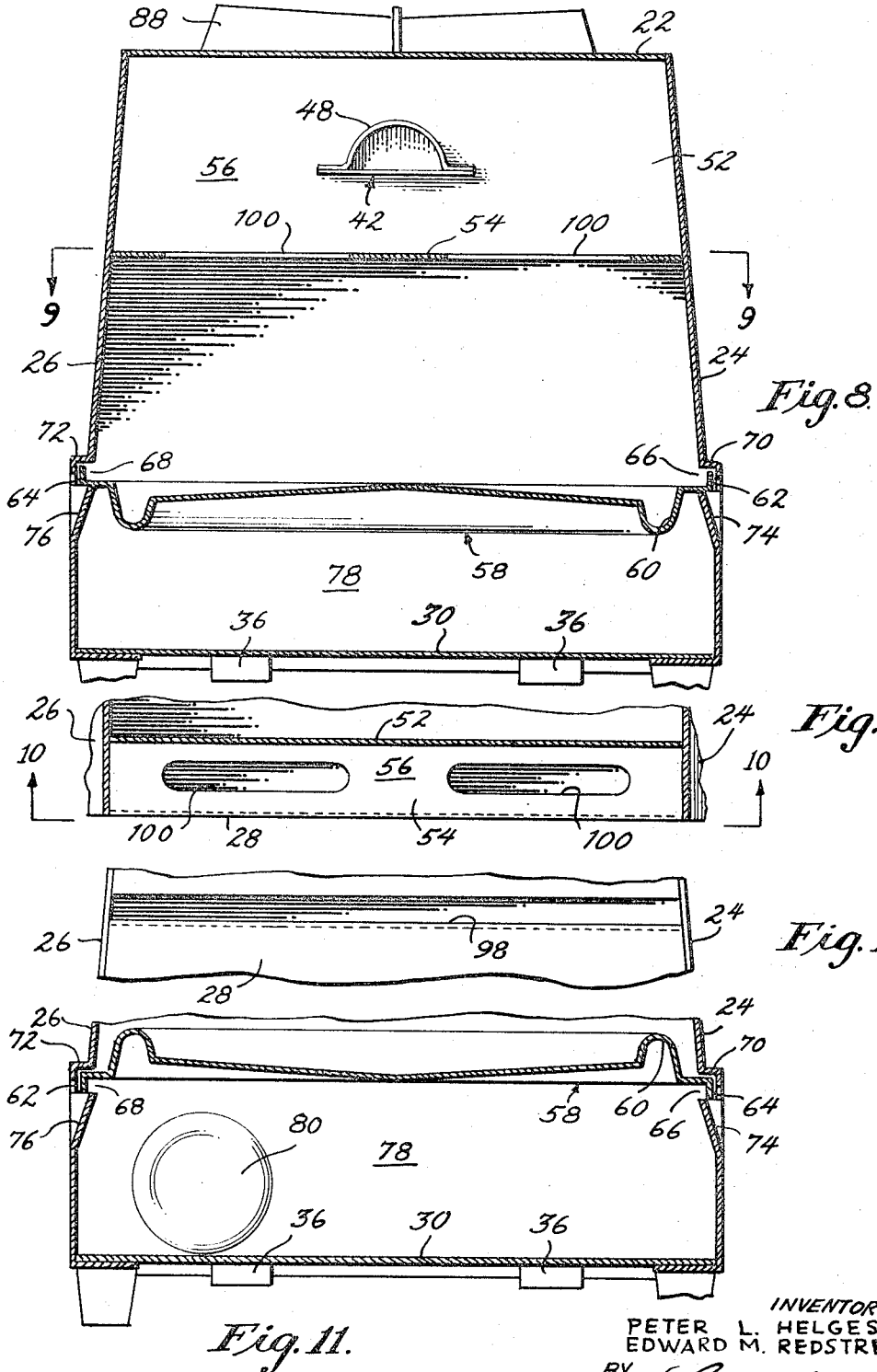

United States Patent Office 3,332,339
Patented July 25, 1967

3,332,339
PORTABLE OUTDOOR BROILER AND COOKER
Peter L. Helgeson and Edward M. Redstreake, Macungie, Pa., assignors to Caloric Corporation, Topton, Pa., a corporation of Pennsylvania
Filed Aug. 18, 1966, Ser. No. 573,254
5 Claims. (Cl. 99—339)

This invention relates to a portable gas burning broiler and cooker which is especially adapted for outdoor use.

One object of this invention is to produce an improved broiler and cooker of the type set forth.

A gas burning outdoor broiler and cooker includes gas cylinders, a hose, and a regulating valve which, if carried separately from the burner, will be cumbersome and inconvenient.

It is therefore a further object of this invention to produce a portable broiler and cooker which is self-contained with the gas cylinders and related equipment stored within the unit for easy transportation and convenient storage.

An outdoor broiler is subject to gusts of wind which interfere with proper combustion and which often extinguish the flame.

It is therefore a still further object of this invention to provide an outdoor broiler and cooker construction, whereby the flame will not be extinguished by a sudden gust of wind.

A still further object is to produce a portable broiler and cooker which is lightweight, compact, durable, and inexpensive to manufacture.

The full nature of this invention will be understood from the following specification and the accompanying drawings in which:

FIG. 1 is a side elevational view of a portable broiler embodying the invention shown in the operation or use position.

FIG. 2 is a top view of the broiler as shown in FIG. 1.

FIG. 3 is a rear elevational view of the broiler as shown in FIG. 1.

FIG. 4 is a front elevational view of the broiler as shown in FIG. 1.

FIG. 5 is a fragmentary enlarged view looking in the direction of line 5—5 on FIG. 3 and showing details of construction.

FIG. 8 is an enlarged view, partly in section, looking in the direction of line 8—8 on FIG. 6.

FIG. 9 is a fragmentary sectional view looking in the direction of line 9—9 on FIG. 8.

FIG. 10 is a view looking in the direction of line 10—10 on FIG. 9.

FIG. 11 is a fragmentary sectional view similar to the lower area of FIG. 8 but showing the drip pan mounted in an inverted or storage position.

Figure 6:
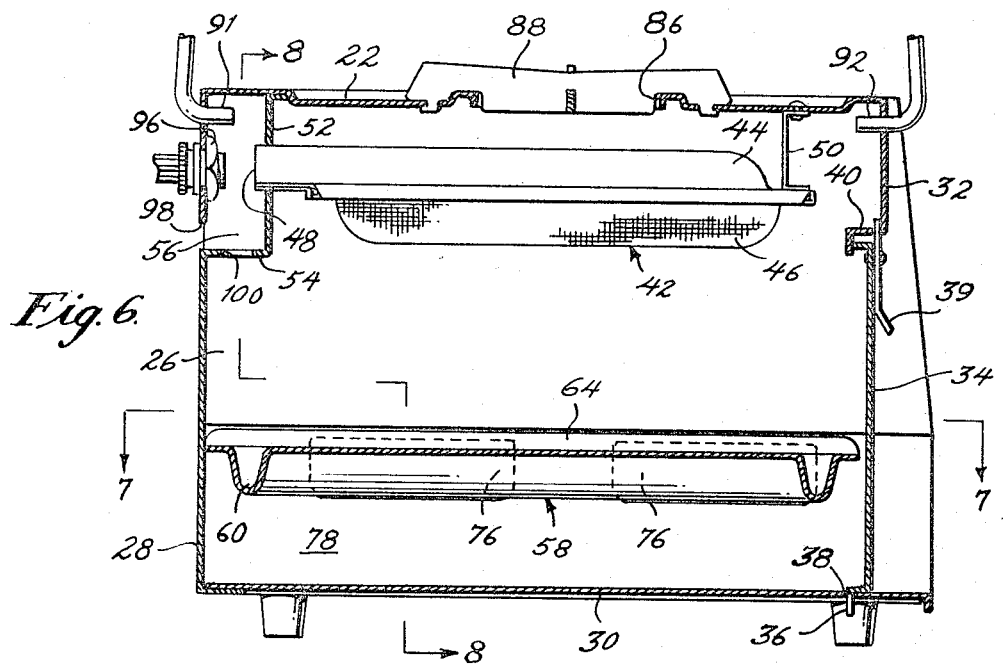
FIG. 6 is a view, partly in section and partly in side elevation, looking in the direction of line 6—6 on FIG. 2.
Figure 7:
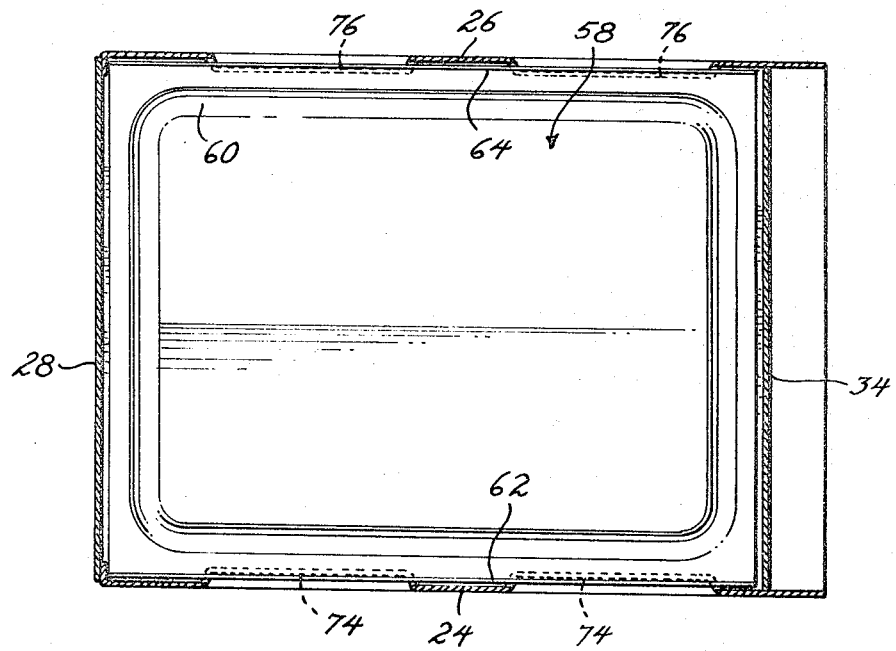
FIG. 7 is a sectional view looking in the direction of line 7—7 on FIG. 6.

A broiler and cooker embodying the invention includes a housing 20 comprising top wall 22, side walls 24 and 26, rear wall 28, and bottom wall 30. The front wall is formed of a fixed upper section 32 and a door 34 detachably secured to said housing as by tabs 36 which engage slots 38 in bottom 30, FIG. 6, and by a manually rotatably latch 39 which engages a keeper 40 on the inner side of section 32. The broiler includes an infra-red ray generating burner 42 which is formed of a solid upper dome shaped gas receiving member 44 and a lower dome shaped foraminous combustion sustaining member 46. Upper member 44 has an open gas receiving end 48. Lower member 46 is formed of one or more screens which are arranged in a suitable manner. As seen in FIG. 6, burner 42 is centrally mounted within the upper area of housing 20 with one end thereof supported by a bracket 50 and the other end thereof passing through wall 52 which coacts with the top, rear, and side walls of housing 20, and with bottom wall 54, to form a gas and air receiving and mixing chamber 56 which preferably extends the entire width of the housing. The broiler further includes a food supporting pan 58 which is slightly dihedral in cross section, as shown in FIG. 8, and which has a peripheral trough 60 for collecting grease. Side edges 62 and 64 of the pan are slidable in channels 66 and 68 which are defined by wall portions 70 and 72 and by ledges 74 and 76 of side walls 24 and 26 respectively.

Pan 58 can be inserted in channels 66 and 68 to provide an upper cooking position or it can be placed upon bottom 30 to provide a lower cooking position. In its upper cooking position, pan 58 coacts with the bottom 30 and with the lower portions of the side rear walls of the housing to form a storage compartment 78 for receiving gas cylinder 80, the gas hose 82 and the regulating valve 84, and other equipment. It will be noted that while the pan is in its upper cooking position, the depth of compartment 78 will be less than the diameter of the gas cylinders unless the pan is inverted from the position as shown in FIG. 8 to the position as shown in FIG. 11. This prevents the possibility of the gas cylinder being left in the storage compartment while the broiler is being used.

Top wall 22 has an opening 86 therein which is covered by a grating 88 whereby rising products of combustion may be vented or utilized to cook or to keep foods warm.

The broiler is provided with a handle 90 which is pivotally attached to housing 20 by the insertion of ends 91 and 92 of the handle into holes provided in the front and rear walls near the top of the housing. As can be seen in FIGS. 3 and 5, when the handle is not being used, it rests in point contact with the edges of top 22, as at 94. By this arrangement, heat conduction to the handle is minimized and such heat which was absorbed by the handle will be quickly dissipated. In actual practice, it has been found that the handle remains cool enough to touch even after prolonged use of the broiler.

As above described, the open gas receiving end 48 of burner 42 extends into chamber 56 which is supplied with gas by hose 82 which detachably connects to adapter 96 mounted in rear wall 28 opposite end 48. As seen in FIGS. 6 and 10, a primary air intake slot 98 extends across rear wall 28 and establishes communication between the atmosphere and the lower end portion of chamber 56. To prevent flashback or extinguishment of the flame on the screen surface by a sudden gust of wind through the open front of housing 20 or by rushing in through slot 98, I provide openings 100, which, as best seen in FIGS. 6 and 9, are formed in bottom wall 54 of chamber 56 and which establish communication between the interior of housing 20 and chamber 56. By this arrangement the air pressure within burner 42 will be substantially equalized, outdoor variations within a reasonable range notwithstanding.

The operation of this broiler and cooker is as follows:

When the broiler is used outdoors, it is preferably placed with its rear wall facing into the wind. Door 34 is removed, and the gas cylinders, valve assembly, and hose, are taken out of storage compartment 78. Clamp 102, which when not in use, hangs against rear wall 28, is raised to receive a cylinder as shown in FIG. 1 and the valve assembly and hose are connected to the cylinder and to adapter 96, respectively. Broiler pan 58 is then placed either in its upper cooking position by sliding it into channels 66 and 68, or in its lower cooking position by placing it on bottom 30 with trough 60 facing upwardly to receive the grease and cooking juices. While food is broiling or cooking, the heated products of combustion rising through opening 86 can be utilized to cook or heat other foods which are placed on grating 88. To pack the broiler for storage, the pan is inverted to enlarged compartment 78 and the gas cylinder, the regulating valve, the hose, and so forth, are placed in the storage compartment. Since the pan 58 extends across the entire area of the housing, it confines the cylinders and other items stored in the compartment and prevents the possibility of them damaging the burner screens.

What we claim is:

1. An outdoor broiler and cooker including in combination:
   a housing having an access opening,
   a fuel and air receiving and mixing chamber near the top of said housing,
   means for delivering fuel to said chamber,
   a gaseous fuel burner mounted near the top of said housing with its inlet end communicating with said chamber,
   there being a first opening leading from the atmosphere into said chamber, and
   a second opening leading from said chamber into the interior of said housing,
   whereby said openings provide means of escape for increased air pressure caused by a gust of wind through said access opening or through said first opening to prevent major disturbance in the operation of the burner.

2. An outdoor broiler and cooker including in combination:
   a housing having a top and bottom,
   a gaseous fuel burner mounted near the top of said housing,
   a fuel container,
   means connected to said container for supplying fuel to said burner,
   a food supporting pan,
   means reversibly mounting said pan in spaced relation to said bottom to provide a storage compartment,
   said pan having a "use" position in which the depth of said compartment is less than the maximum dimension of said container to prevent location of said container in said compartment while the pan is in its "use" position, said pan having a "non-use" position in which the depth of said compartment is greater than the maximum dimension of said container to permit storage of said container in said compartment.

3. The outdoor broiler and cooker defined in claim 2 wherein the plane of said pan is slightly dihedral in cross-section to facilitate drainage and wherein said pan has a peripheral trough for receiving the drainage.

4. The outdoor broiler and cooker defined in claim 2, and
   there being an opening located in the top of said housing for venting products of combustion.

5. The outdoor broiler and cooker defined in claim 4, and
   a grate over said opening for supporting food to be cooked or warmed.

References Cited

UNITED STATES PATENTS

| | | | |
|---|---|---|---|
| 2,572,870 | 10/1951 | Kennedy | 99—339 |
| 3,067,811 | 12/1962 | Webster | 126—41 |
| 3,103,160 | 9/1963 | Forniti et al. | 99—339 |

WALTER A. SCHEEL, *Primary Examiner.*

R. W. JENKINS, *Assistant Examiner.*